July 10, 1956
C. N. KIMBERLIN, JR
2,754,176
PREPARATION OF ALUMINA BY BURNING
Filed Dec. 24, 1953
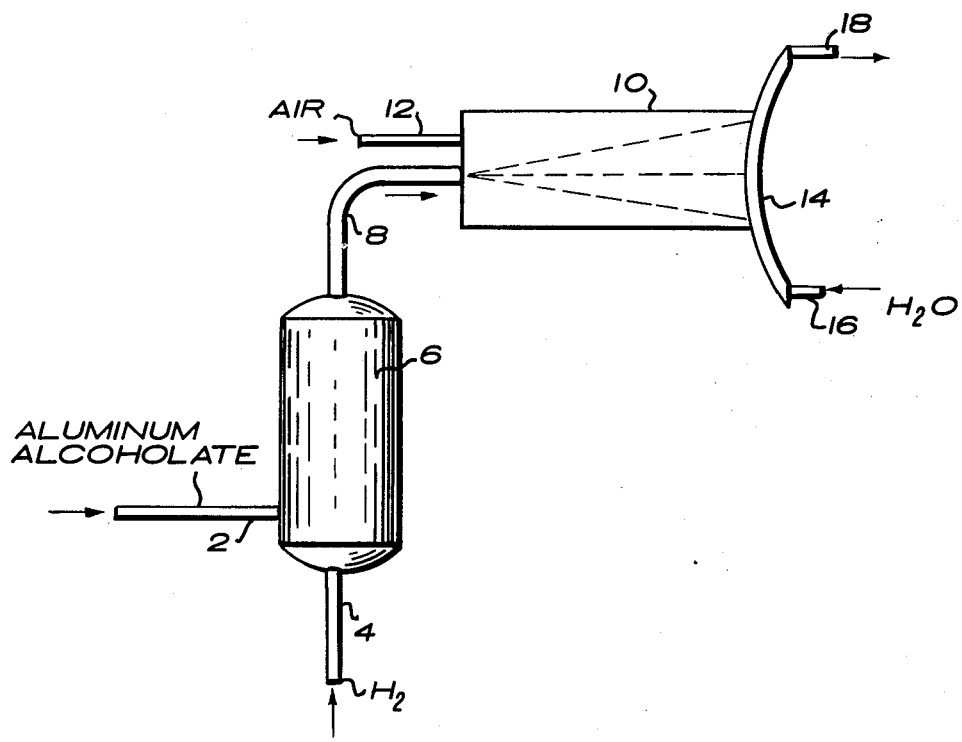
CHARLES N. KIMBERLIN, JR. INVENTOR
BY *Henry Berk*  ATTORNEY

United States Patent Office 2,754,176
Patented July 10, 1956

2,754,176

PREPARATION OF ALUMINA BY BURNING

Charles N. Kimberlin, Jr., Baton Rouge, La., assignor to Esso Research and Engineering Company, a corporation of Delaware Application December 24, 1953, Serial No. 400,232

7 Claims. (Cl. 23—142)

The present invention relates to the preparation of finely-divided alumina. More particularly, the present invention relates to the preparation of a finely divided alumina of extremely minute particle size and high degree of purity. Still more specifically, the present invention relates to the preparation of alumina from aluminum alcoholates.

The method of making alumina from aluminum metal by forming an alcoholate and thereafter hydrolyzing the alcoholate is now well known in the art. In these processes, an essentially anhydrous alcohol is heated together with metallic aluminum, preferably in the presence of a small amount of a reaction initiator, and the solution of aluminum alcoholate thus produced is hydrolyzed with water or dilute acid to produce alumina which is recovered by conventional techniques.

Though this process is highly satisfactory for preparing alumina of reasonably large particle size which may be reduced by grinding to particle sizes in the order of 1 to 5 microns, the process does not lend itself to production of extremely fine particles. The larger particles formed by variations of the hydrolysis technique, are particularly useful for catalytic preparations including utility as supports for other catalysts. Since particle size resulting from hydrolysis varies over a considerable spread, these particles are particularly adapted for use as supports for fluidized solids technique operations, such as fluidized hydroforming.

For certain purposes, however, an extremely finely divided alumina is highly desirable. Such purposes include fillers for compounding with and giving strength to rubber. Other uses for highly comminuted alumina particles, which particles should be of the order of less than about one micron in diameter, are polishing agents and in particular as carriers for phosphors for use in fluorescent lights and fluorescent screens such as in television tubes. The latter purpose also requires an extremely pure product.

It is, therefore, an object of the present invention to provide a process of producing alumina of a high degree of comminution from aluminum alcoholate, that is, the reaction product of aluminum and various alcohols such as ethyl, normal and isopropyl, isobutyl, and the like, or mixtures of these.

It is also a further object of the present invention to produce a finely divided alumina suitable for industrial application in rubber compounding and as carrier for phosphorescent and luminescent material.

Other and further objects and advantages of the present invention will become more clear hereinafter.

In accordance with the present invention, extremely finely divided alumina is obtained by burning of aluminum alcoholates, preferably vaporized and diluted with a combustible gas prior to burning, and collecting the solid matter of the smoke. Thus when aluminum ethylate or isopropylate is burned, there is produced a dense white smoke, the solid matter of which is an exceptionally finely divided alumina of a high degree of purity and relatively high particle density. This solid may be collected by impingement on a solid surface, by electrical precipitators, centrifugal means, scrubbing, filters, or other conventional means. The alumina thus collected needs no further purification or activation treatment, and is in a state ready for use for the purposes enumerated above, to which also may be added its adaptability as a catalyst, catalyst support, adsorptive contacting agent and filter medium.

The process of the present invention may best be understood from the more detailed description hereinafter, wherein reference is made to the accompanying drawing which is a schematic illustration of a system suitable for carrying out a preferred embodiment of the invention.

Referring now to the drawing, a stream of aluminum alcoholate, such as aluminum isopropoxide is passed via line 2 into vaporization tower 6. The process of preparing the alcoholate is well known in the art and is not a part of the present invention. Briefly, metallic aluminum chips, turnings or the like is charged to a reactor vessel (not shown). To the same vessel is charged the alcohol corresponding to the aluminum compound desired, i. e. ethyl, isopropyl, etc., and also advantageously a light naphtha fraction boiling in the range of about 200–300° F. The naphtha serves as a solvent for the aluminum alcoholate reaction product; if desired, this may be omitted or replaced by an excess of alcohol. About 54 pounds aluminum is employed in conjunction with about 124 gallons of a 50/50 mixture of alcohol and naphtha. It is advantageous to add small amounts of a reaction initiator, such as mercuric chloride, aluminum chloride, or iodine. Also, it is usually necessary to heat the mixture to boiling to start the reaction between the metal and the alcohol. Once started, cooling is generally necessary. Water, of course, is carefully excluded. The products of the reaction comprise hydrogen, which escapes as a gas, and a solution of aluminum alcoholate in excess alcohol or in a mixture of naphtha and excess alcohol depending upon the starting materials charged to the reactor. The solution of aluminum alcoholate may be used as such; however, it is preferred to recover the excess alcohol and naphtha by distillation overhead leaving the pure aluminum alcoholate as bottoms. If desired, the aluminum alcoholate may be further purified by vacuum distillation. The distillation of aluminum alcoholates may be accomplished, depending upon the particular alcohol or alcohols employed for the preparation, in the temperature range of about 250° to 570° F. at pressures of about 5 to 20 millimeters of mercury absolute.

The aluminum alcoholate prepared as above is thereafter conducted to vaporizing tower 6 via line 2. Tower 6 is maintained at vaporization temperatures of 300° to 600° F., depending upon the nature of the alcoholate. A stream of carrier gas, such as hydrogen, natural gas, carbon monoxide, dry water gas, producer gas, or mixtures of these with an inert gas such as nitrogen and the like is admitted to tower 6 via line 4 and the gas with vaporized aluminum alcoholate is withdrawn upwardly through line 8 to combustion tube 10. The mixture passing from vaporizer tower 6 through line 8 comprises about 0.5 to 5 mol per cent aluminum alcoholate with the remainder being carrier gas; the lower the concentration of the aluminum alcoholate in this mixture the smaller is the particle size of the alumina product. Air previously dried is admitted through line 12, the amount being carefully regulated to avoid formation of explosive mixtures of oxygen and carrier gas. The gas streams flow through tube 10 at a velocity sufficient to carry the particles of alumina resulting from combustion to cooling surface or baffle 14. For the purpose of description, curved baffle zone 14 may be supplied with cooling medium such as water introduced at 16 and withdrawn at 18. The particles in part impinge and collect on the cooling surface, and may be removed by suitable means, such as scrapers.

The process of the present invention may be readily understood from the following example illustrating the same.

Example

Aluminum metal was dissolved in and reacted with substantially anhydrous isopropyl alcohol in the proportions and manner previously described. The resulting aluminum isopropoxide, heated to 360° F., was vaporized in a stream of hydrogen which was then burned in air. The smoke, which consisted of an extremely finely divided alumina, was collected on a cold surface. X-ray analysis of the collected product showed that it consisted essentially of the delta crystalline form of the compound, which is readily convertible, if desired, to the alpha form by further heating.

The particles prepared as above were further examined by an electron microscope. An electron micrograph taken at a magnification of 79,000 diameters showed the particles to be predominantly spherical, with diameters in the range of about 500 to 1000 Angstrom units.

The extremely fine state of subdivision and homogeneity of particle size attainable by the process of the present invention is noteworthy. It is impossible to duplicate this by such means as grinding, hydrolysis of aluminum gels etc. The very narrow particle range spread is particularly important in such uses as abrasives, pigments, and carriers for phosphors for use in fluorescent lights or screens. Grinding of alumina gives particles of 1–2 microns (10,000–20,000 Angstrom) with a considerably larger particle size spread.

The process of the present invention may be modified in many details. The amount of diluent gas may vary; in general, the greater the volume of diluent gas, which preferably is a combustible gas, the finer the state of subdivision of the particles. Also, other volatile organic compounds of aluminum, such as ethyl aluminum, may be employed.

In another embodiment of the present invention extremely finely divided alumina may be obtained by hydrolyzing the aluminum alcoholate vapor, again preferably diluted with a gas at a temperature in the range of 212° to 500° F., employing water vapor as a hydrolyzing medium. For this purpose the diluent gas need not be a combustible gas but may be an inert gas. At the lower temperatures of this modification, extremely finely divided alumina alpha-monohydrate is produced and the hydrolyzed alumina may be converted to other crystalline phases by suitable calcination if desired.

What is claimed is:

1. An improved process for producing extremely finely divided particles of alumina which comprises vaporizing an aluminum alcoholate at a temperature of about 300 to about 600° F. in a vaporization zone, passing through said zone a combustible diluent gas, passing a mixture of said diluent gas and vaporized aluminum alcoholate to a combustion zone, subjecting said mixture to a combustion reaction in said zone, and recovering alumina particles.

2. The process of claim 1 wherein said aluminum alcoholate is aluminum isopropylate.

3. The process of claim 1 wherein said aluminum alcoholate is aluminum ethylate.

4. The process of claim 1 wherein said combustible diluent gas is hydrogen.

5. The process of claim 1 wherein the mixture subjected to combustion comprises 0.5 to 5 mol % aluminum alcoholate.

6. An improved process for producing extremely finely divided alumina particles which comprises volatilizing a volatile aluminum alcoholate and reacting the volatilized aluminum alcoholate with air by burning of the volatile aluminum alcoholate.

7. An improved process for producing extremely divided alumina particles which comprises vaporizing an aluminum alcoholate in a vaporization zone to produce vaporous aluminum alcoholate, passing to said zone a combustible gas, and thereafter reacting said volatilized alcoholate and combustible gas with air.

References Cited in the file of this patent

UNITED STATES PATENTS

| 1,850,286 | Mittasch et al. | Mar. 22, 1932 |
| 2,579,251 | Coates et al. | Dec. 18, 1951 |
| 2,636,865 | Kimberlin | Apr. 28, 1953 |